June 23, 1942.  H. S. JANDUS  2,287,615
FENDER SHIELD AND MOUNTING
Filed July 15, 1940  2 Sheets-Sheet 1
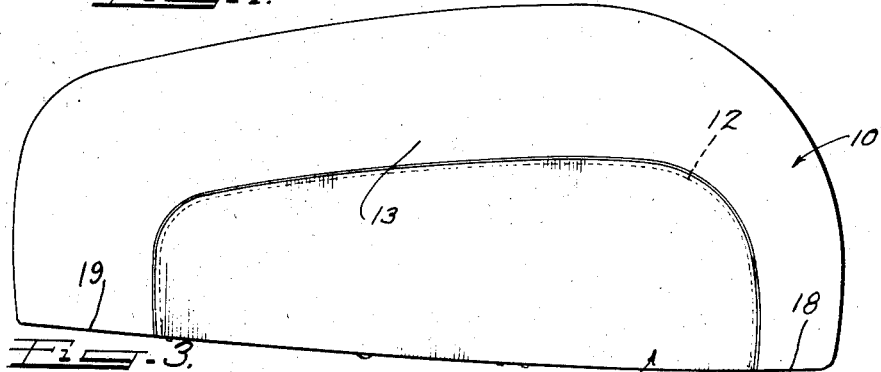
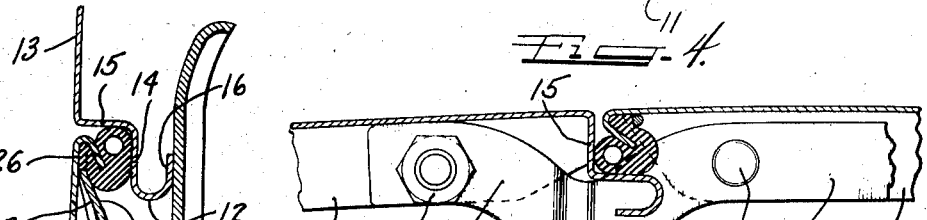
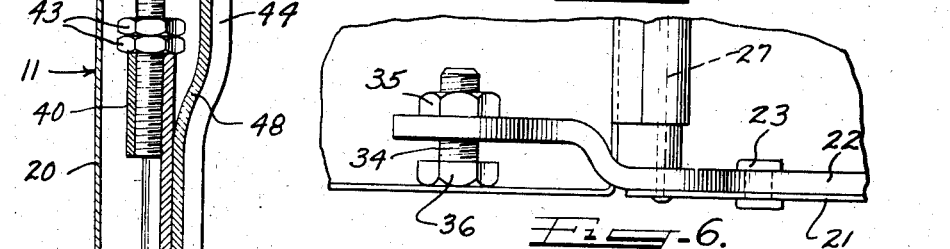
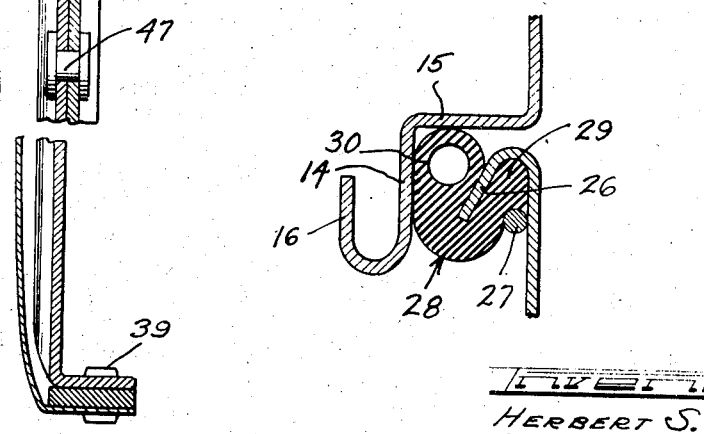
Inventor
HERBERT S. JANDUS.

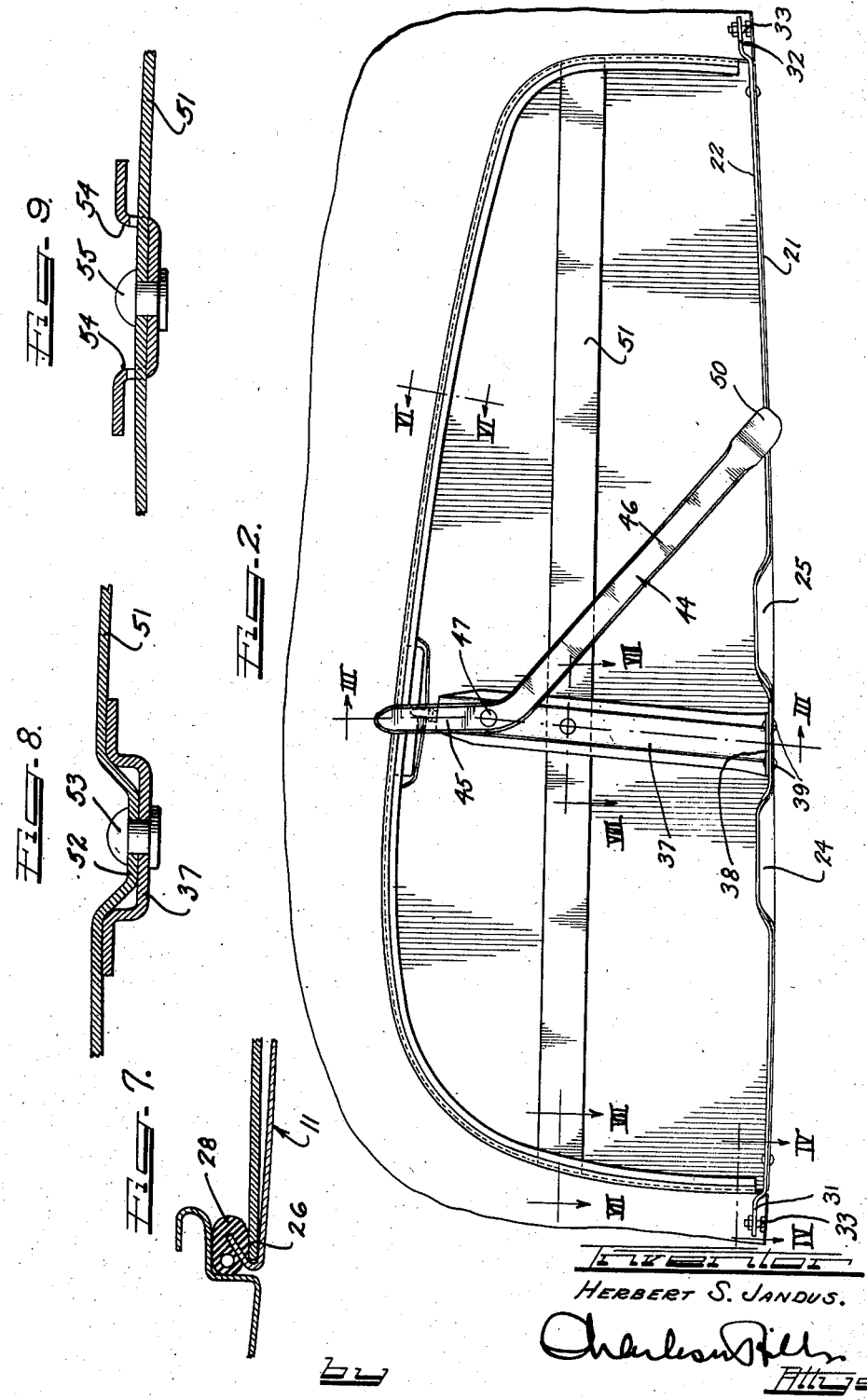

Patented June 23, 1942

2,287,615

UNITED STATES PATENT OFFICE 2,287,615

FENDER SHIELD AND MOUNTING

Herbert S. Jandus, Detroit, Mich., assignor to Houdaille-Hershey Corporation, Detroit, Mich., a corporation of Michigan Application July 15, 1940, Serial No. 345,477

7 Claims. (Cl. 280—153)

This invention relates to fender shields and fender shield assemblies, and more particularly to a fender shield having novel means thereon for maintaining the fender shield in tight mounted engagement on a vehicle fender.

In the vehicle industry, and particularly in the automobile industry, various means have been utilized to improve the appearance of vehicle fenders. The usual vehicle fender is provided with an opening which affords access to the vehicle wheel, and which permits the ready removal of the wheel in an axial direction. Since this opening inherently presents an ugly outward appearance, detachable fender shields have been employed to substantially cover this opening.

As the term "fender shield" shall hereinafter be employed, it refers to any member which is adapted to be secured to a fender or other portion of a vehicle body for the purpose of covering the opening in the fender or vehicle body which is provided for access to or removal of a vehicle wheel. Furthermore, as the term "fender" shall hereinafter be employed, it refers to any form of wheel fender in its broad sense, whether such fender be separate from the vehicle body, partially separate from the vehicle body, or actually an integral part of the vehicle body, and whether or not it projects outwardly away from the principal body portion of the vehicle.

It is an object of the present invention to provide a novel fender shield and mounting.

It is a further object of this invention to provide a novel fender shield which is economical to manufacture, which is rugged and reliable in use, and which may be readily and quickly mounted on and removed from a fender by the ordinary user of the vehicle.

A still further object of this invention is to provide a novel fender shield having a spring steel reinforcing member extending across the back thereof.

Another and further object of this invention is to provide novel means for increasing the resiliency of the panel portion of a fender shield.

The novel features which I believe to be characteristic of my invention are set forth with particularity in the appended claims. My invention, itself, however, both as to its organization and manner of construction, together with further objects and advantages thereof, may best be understood by references to the following description taken in connection with the accompanying drawings, in which:

Figure 1 is a front elevational view of a vehicle fender and fender shield assembly;

Figure 2 is a rear elevational view of the fender and fender shield assembly as shown in Figure 1;

Figure 3 is a cross-sectional view through the fender shield and fender as taken along the line III—III of Figure 2;

Figure 4 is a fragmentary sectional view of the lower forward corner of the fender shield and fender looking down on the supporting arm, as taken along the line IV—IV of Figure 2;

Figure 5 is a rear elevational view of the lower forward corner of the fender shield, showing the manner in which the supporting arm of the fender shield engages the fender;

Figure 6 is a fragmentary sectional view of the edge of the fender shield, showing the manner in which it is seated on an offset shoulder of the fender, as taken along the line VI—VI of Figure 2;

Figure 7 is a fragmentary sectional view illustrating the manner in which the spring steel bar on the rear face of the fender shield is grasped by the turned-back edge of the fender shield, as taken along the line VII—VII of Figure 2;

Figure 8 is a sectional view of the upright strut and illustrates the manner in which the spring steel bar is connected thereto, as taken along the line VIII—VIII of Figure 2; and Figure 9 is a sectional view similar to Figure 8 illustrating a modification of the present invention.

Referring now to Figures 1 to 8 of the drawings, which illustrate one embodiment of the present invention, there is illustrated therein a vehicle fender 10 having a fender shield 11 mounted thereon over the wheel access opening 12 in the outer depending side wall 13 of the fender 10. While the fender 10 may assume a wide variety of shapes without departing from the spirit and scope of the present invention, and may, indeed, be formed integral and made a part of the vehicle body itself (not shown), the fender 10 has been illustrated as being of a high-crowned type which is employed on one of the conventional motor vehicles of the present day.

In order to permit the fender shield 11 to be mounted so that its outer face is flush with the outer depending side wall 13 of the fender 10, the fender 10 is provided with an offset shoulder 14, which is integrally connected to the depending wall 13 by connecting flange 15. The shoulder 14 has its peripheral edge folded back on itself in an open fold, as at 16, to reinforce and stiffen the offset shoulder 14 around its free edge. The extremity of the fold defined by the bent-back portion 16 forms the opening-defining edge 12 of the fender 10 previously referred to. The depth of the connecting flange 15 is such that when the fender shield 11 is seated on the offset shoulder 14 the outer face of the fender shield 11 is substantially flush with the outer depending wall 13 of the fender 10.

The lower edge of the fender 10 is provided with a rearwardly extending flat flange 17. This rearwardly extending flange 17 stiffens the forward and rear base edges 18 and 19, respectively, of the fender 10 in the conventional manner.

The fender shield 11 comprises a sheet metal panel 20 which is large enough to cover the entire wheel access opening 12 as shown in Figures 1 and 2. More specifically, it is dimensioned to be positioned snugly within the connecting flange 15 and be seated on the offset shoulder 14 of the fender 10. The lower edge of the panel 20 is approximately straight and is bent back to form a substantially horizontal flange 21, to the upper side of which is secured a reinforcing bar 22 by means of rivets 23. At two spaced points along the lower edge of the fender shield 11 the horizontal flange 21 and the reinforcing bar 22 are twisted up as at 24 and 25. This has been found desirable in some instances to give greater clearance for the hub cap of the wheel (not shown) and the tire (not shown), which lie immediately behind twisted portions 24 and 25, respectively. This novel feature of twisting the reinforcing bar and the base flange of the fender shield is described and claimed in the copending application of George W. Schatzman, Serial 345,454, filed July 15, 1940, and assigned to the same assignee as the present invention.

The remainder of the edge of the panel 20 at the ends and around the top of the shield and which lies against the offset shoulder 14 is folded back, as shown in Figures 3, 4, 6, and 7, to form a stiffening flange 26. The stiffening flange 26 not only serves to strengthen the edge of the panel but also serves, in connection with a stiff wire 27, to secure a rubber edging 28, which prevents metal-to-metal contact between the edge of the metal panel and the side of the fender 10. The main portion 29 of the rubber edging 28, as may be seen best in Figure 6, fits in under the inturned edge 26 of the panel 20 and is held in place by the wire 27, which bears against a suitable shoulder on the rubber edging 28. The wire 27 and the rubber edging 28 extend around the entire curved edge of the shield, the two lower ends of the wire 27 being secured to the fender shield in any suitable manner (not shown). This particular type of mounting for a rubber edging is disclosed and claimed in the copending application of George W. Schatzman entitled "Fender shield," Serial 269,651, filed April 24, 1939, and assigned to the same assignee as the present invention.

The outer portion 30 of the rubber edging 28 is in the form of a hollow bead and is shaped to be seated on the offset shoulder 14 and to frictionally bear against the connecting flange 15 of the fender 10. It will be understood that the rubber edging 28 prevents rattling and other noise due to a metal-to-metal contact in the fender shield and fender assembly and also forms a seal between the fender shield and fender to prevent the passage of mud and dirt.

The bottom of the fender shield 11 is provided with two trunnion members or support arms 31 and 32, by means of which the fender shield 11 is supported on the rearwardly projecting flange 17 of the fender 10. These trunnion members or supporting arms 31 and 32 preferably are formed as an integral part of the reinforcing bar 22 by bending the ends of the reinforcing bar 22 upwardly and around the connecting flange 15 and then providing an adjustable leg 33, which extends down and is seated on the horizontal flange 17 of the fender 10. The adjustable leg 33 may be conveniently provided by a bolt 34, which is threaded through a suitable threaded opening in the end of the reinforcing bar 22 and which is locked in place by a lock nut 35. The head 36 of the bolt 34 is disposed to be seated on the horizontal flange 17 of the fender 10. This adjustable trunnion arrangement is fully described and claimed in the copending application of George W. Schatzman, entitled "Fender shield and assembly," U. S. Serial 345,454, filed July 15, 1940, and assigned to the same assignee as the present invention.

The fender shield 11 is also provided with a brace bar or strut 37 which extends generally upwardly and slightly rearwardly behind the panel portion 20 from the lower edge of the shield to a point in proximity to the top. This strut 37 has a base portion 38 which is seated on the horizontal reinforcing bar 22 carried on the base flange 21 of the fender shield 11 and which is riveted or otherwise suitable secured thereto, as at 39. In order that the strut 37 may possess sufficient rigidity without an undue amount of metal being employed therein, it is preferably channel shape in cross section, as may be seen best in Figures 2 and 8. The top end of the strut 37 is provided with a collar 40, which is arranged to receive a threaded stud 41 carried by a plate member 42, which extends up into and against the folded-back edge 26 of the sheet metal panel 20. A pair of nuts 43 are threaded onto the stud 41 and tighted against the collar 40 to force the plates 42 tightly up against the folded-back edge 26.

The novel features of this brace bar and the manner in which it is secured to the fender shield 11 are described in detail and claimed in my copending application entitled "Fender shield and mounting means therefor," Serial 271,915, filed May 5, 1939, and assigned to the same assignee as the present invention.

A latching arm 44 is provided on the rear face of the fender shield 11 for the purpose of retaining the fender shield in desired position on the fender 10. It will be understood that the fender shield 11 receives vertical support from the trunnion members 31 and 32 and is locked laterally into place by means of the latch member 44. This latch member includes a short leg portion 45 and a relatively long leg portion 46, which is disposed at an angle with respect to the short leg portion. The latching arm 44 may be conveniently mounted on the fender shield by a mounting stud or rivet 47 carried by the upright strut 37. The short leg portion 45 is bent obliquely rearwardly, as at 48, and then upwardly, as at 49, so as to engage the folded-back edge 16 of the offset shoulder 14 of the fender 10. The long leg portion 46 of the latching arm 44 extends downwardly to the lower edge of the fender shield 11, and its end 50 is bent to rest on top of the reinforcing bar 22. The latch member 44 is rotatable about its mounting stud 47 so as to move the short leg portion 45 thereof into and out of latching engagement with the curled-back edge 16 of the fender 10.

The fender shield 11 is formed so that, before it is mounted on the fender, the edges at the front and rear are less convex than the side of the fender and the edge at the central portion of the top is more convex than the side of the fender. With the fender shield panel 20 shaped in this manner, it is found that when the trunnions 31 and 32 are hooked onto the flange 17 of the bottom of the fender 10 and the panel 20 is swung up into position against the side of the fender, a tight contact between the edge of the fender shield panel and the fender is first made at the ends of the fender shield near the bottom, while the top of the panel is still spaced out from the side of the fender. As the top of the fender shield is pressed into position, the fender shield panel 20 is sprung or strained slightly, and the distance along which the edge of the fender shield is in tight contact with the offset shoulder 14 of the fender 10 extends up at each end of the fender shield until the entire top edge of the fender shield is in tight contact with the shoulder 14. The latch 44 may then be swung to move the short leg 45 into latching engagement with the turned-back edge 16 of the offset shoulder 14 of the fender 10. This warping or progressive forcing of the fender shield into place on the fender provides a very tight and snug engagement between the fender shield and the fender and forms a mounting which is substantially free from vibration and noise.

The present trend in the vehicle industry appears to be to lengthen the fender and to decrease the height of the wheel access opening therein. This is found to be particularly true on the larger automobiles. Now, as the fender shield is increased in length and decreased in height, it has been found that in many cases the metal forming the sheet metal panel 20 of the fender shield 11 is not sufficiently stiff to provide the desirable warping action described above. One of the principal features of the present invention is to provide means on the fender shield to supplement the inherent stiffness of the sheet metal panel forming the fender shield for bringing about the above highly desirable characteristics.

More specifically, I have provided a fender shield having a spring steel bar 51 extending the long way across the back of the fender shield 11. The bar 51 is preferably made of metal stock which is thicker than that employed in forming the sheet metal panel 20. It has also been found that this bar should preferably be formed of spring steel or some other similar material which is relatively stiff. The ends of the bar 51 extend behind the turned-back edge 26 and the rubber edging 28. The ends of the bar 51 may be held simply by crimping the turned-back edge 26 onto the ends of the bar 51, or these ends may be spot-welded or otherwise suitably secured to the rear face of the sheet metal panel 20 forming the fender shield 11. The central portion of the stiffening bar 51 is bent into the channel portion of the strut member 37, as at 52 (see Figure 8). This bent-in portion 52 of the stiffening bar 51 is preferably riveted or otherwise suitably secured to the strut member 37 as at 53.

In Figure 9 of the drawings I have shown a modification of the connection of the stiffening bar 51 to the strut member 37. More particularly, the side flanges 54 of the strut member 37 are slotted and the bar 51 is passed directly through these side flanges. In this case, as in Figure 8, the stiffening bar is riveted or otherwise suitably secured to the strut member 37, as at 55.

As will at once be understood by those skilled in the art, this stiffening bar 51 mounted on the rear face of the fender shield 11 and extending across the long dimension of the fender shield greatly assists in providing the necessary stiffness to the warping of the edge of the fender shield into place against the offset shoulder 14 of the fender 10. It furthermore greatly assists and supplements the tight fit of the fender shield against the fender.

While the preferred embodiment of the invention has been described as providing a stiffening bar extending lengthwise across the fender shield, it is, of course, to be understood that the present invention contemplates the use of stiffening bars extending in other directions across or partially across the fender shield.

While I have shown particular embodiments of my invention, it will, of course, be understood that I do not wish to be limited thereto, since many modifications may be made, and I, therefore, contemplate by the appended claims to cover all such modifications as fall within the true spirit and scope of my invention.

I claim as my invention:

1. As an article of manufacture, a fender shield for disposition on a vehicle fender over the wheel opening thereof, a resilient stiffening member mounted on and extending over the rear face of said shield and secured thereto at its outer end, the peripheral edge of said fender shield and said resilient stiffening member being shaped so that in an unstressed position the peripheral edge of said fender shield cannot be seated on said fender, and means on said shield engageable with said fender for warping said shield and said stiffening member, whereby said shield is held in tight engagement with said fender throughout substantially its entire peripheral edge.

2. As an article of manufacture, a fender shield for disposition on a vehicle fender over the wheel opening thereof, a resilient bar mounted on and extending lengthwise over the rear face of said shield, the peripheral edge of said fender shield and said resilient bar being shaped so that in an unstressed position the peripheral edge of said shield is held partially out of engagement with said fender by said bar, and means on said shield engageable with said fender for warping said shield and flexing said resilient bar to place said shield in tight engagement with said fender throughout substantially its entire peripheral edge.

3. As an article of manufacture, a fender shield for disposition on a vehicle fender over the wheel opening thereof, a spring steel bar mounted on and extending substantially completely across the rear face of said shield and secured thereto at its outer end, the peripheral edge of said fender shield and said spring steel bar being shaped so that in an unstressed position the peripheral edge cannot be seated on said fender, and means on said shield engageable with said fender for warping said bar and said shield into tight engagement with said fender throughout substantially its entire peripheral edge.

4. A flexible fender shield construction of the type arranged to be warped into place on a vehicle body part over the wheel opening thereof, said shield comprising a flexible sheet metal panel, a substantially upright rigid strut member mounted on and extending across the rear face of said shield, a resilient stiffening member extending generally lengthwise across the rear face of said shield and secured at opposite ends thereto, said stiffening member augmenting the resiliency of said panel, and supporting and latching means on said fender shield for detachably securing said shield to a vehicle body part and for flexing said shield and stiffening said member, thereby to place the same under stress.

5. A flexible fender shield construction of the type arranged to be warped into place on a vehicle body part over the wheel opening thereof, said shield comprising a flexible sheet metal panel, a substaintially upright strut mounted on the rear of said fender shield, a resilient stiffening member secured to and carried by said strut, the ends of said resilient stiffening member engaging the peripheral edge of said shield, said resilient stiffening member augmenting the inherent stiffness of said sheet metal panel to flexing, and supporting and attaching means on said shield for detachably securing said shield in desired position on a vehicle body part over a wheel opening therein.

6. A flexible fender shield construction of the type arranged to be warped into place on a vehicle body part over the wheel opening thereof, said shield comprising a flexible sheet metal panel, a substantially upright strut having a portion of channel-shaped cross section mounted on and extending across said shield between the top and bottom edges thereof, a resilient bar passing through the walls of said channel portion and carried thereby, the ends of said bar engaging opposite portions of the peripheral edge of said shield, said bar increasing the stiffness of said panel to flexing, and supporting and latching means on said shield for detachably securing said shield in desired position on a vehicle body part.

7. A flexible fender shield construction of the type arranged to be warped into place on a vehicle body part over the wheel opening thereof, said shield comprising a flexible sheet metal panel, a substantially upright strut having a portion of channel-shaped cross section mounted on and extending across said shield between the top and bottom edges thereof, a resilient bar extending across said shield and having its ends in engagement with opposite portions of the peripheral edge of said shield, a portion of said resilient bar lying opposite said strut and being bent into the channel portion of said strut and secured thereto, said resilient bar augmenting the stiffness of said sheet metal panel to flexing, and supporting and latching means on said shield for detachably securing said shield in desired position on a vehicle body part.

HERBERT S. JANDUS.